(12) United States Patent
Stratis et al.

(10) Patent No.: US 7,277,731 B2
(45) Date of Patent: Oct. 2, 2007

(54) ADAPTIVE DIVERSITY ANTENNA SYSTEM

(75) Inventors: Glafkos Stratis, Lake Worth, FL (US); Rudy M. Emrick, Gilbert, AZ (US); Celestino A. Corral, Lake Worth, FL (US); Shahriar Emami, Royal Palm Beach, FL (US); Salvador Sibecas, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 362 days.

(21) Appl. No.: 10/960,808

(22) Filed: Oct. 7, 2004

(65) Prior Publication Data

US 2005/0143037 A1    Jun. 30, 2005

Related U.S. Application Data

(60) Provisional application No. 60/531,943, filed on Dec. 23, 2003.

(51) Int. Cl.
*H04B 1/02* (2006.01)
*H04M 1/00* (2006.01)

(52) U.S. Cl. ............... 455/562.1; 455/101; 455/506

(58) Field of Classification Search ............... 455/560, 455/561, 562.1, 101, 506, 65, 67.11, 67.13, 455/114.2, 123, 279.1, 63.4; 343/729, 751, 343/756

See application file for complete search history.

(56) References Cited

U.S. PATENT DOCUMENTS

| | | | | |
|---|---|---|---|---|
| 5,691,727 A * | 11/1997 | Cyzs | ............... | 342/361 |
| 6,124,824 A | 9/2000 | Xu et al. | | |
| 6,212,406 B1 * | 4/2001 | Keskitalo et al. | ......... | 455/562.1 |
| 6,519,478 B1 * | 2/2003 | Scherzer et al. | ......... | 455/562.1 |
| 6,597,324 B2 * | 7/2003 | Eriksson | ............... | 343/795 |
| 6,608,606 B1 * | 8/2003 | Chang | ............... | 343/797 |
| 6,760,603 B1 * | 7/2004 | Scherzer et al. | ......... | 455/562.1 |
| 6,774,864 B2 * | 8/2004 | Evans et al. | ............... | 343/853 |
| 6,801,514 B2 | 10/2004 | Ma | | |
| 6,985,123 B2 * | 1/2006 | Gottl | ............... | 343/853 |
| 7,038,621 B2 * | 5/2006 | Gabriel et al. | ............... | 342/372 |
| 7,133,645 B2 * | 11/2006 | Thermond | ............... | 455/67.7 |
| 2005/0085270 A1 * | 4/2005 | Sobczak et al. | ......... | 455/562.1 |

OTHER PUBLICATIONS

Sector and polarization dependent wideband indoor propagation Channel measurement at 5.1 GHz. Sibille . . . etal, *VTC 2000, IEEE*.
Results of Double-Directional Channel Sounding Measurements, Werner Wiesbeck . . . etal, *University of Karlsruhe, VTC 2000, IEEE*.
Pathloss reciprocity and correlation coefficients from measurements in a multiscattering environment, Glafkos Stratis . . . etal, *Motorola Internal Report*, 1995.
Use of Neural Networks for System Deployment Simulations and Optimization. Glafkos Stratis . . . etal, *Motorola internal conference* Fort Lauderdale, Summer 1999.

* cited by examiner

*Primary Examiner*—Sonny Trinh
(74) *Attorney, Agent, or Firm*—James A. Lamb; Jeffrey K. Jacobs

(57) ABSTRACT

An antenna system (205) includes an antenna structure (215), a receiver (220), and an antenna system controller (225). The antenna structure includes an arrangement of antennas (237), a signal combiner (240), and a switching matrix (235). The arrangement of antennas is designed to have a set of antenna element separations that are optimized to provide lowest correlation coefficients of intercepted radio signals for a corresponding set of electromagnetic environment types that vary from a very low density scattering environment to a maximum density scattering environment. The antennas (230), (231), (232), (233), (234) in the antenna arrangement each include at least one element that has a common polarization. There is at least one antenna that is a dual polarized antenna. The antenna system selects an antenna element pair that corresponds to the environment type which it is operating and thereby receives a best combined signal.

20 Claims, 2 Drawing Sheets ns ADAPTIVE DIVERSITY ANTENNA SYSTEM

REFERENCE TO RELATED APPLICATION

The present application claims priority from provisional application, Ser. No. 60/531,943, entitled "ADAPTIVE DIVERSITY ANTENNA SYSTEM," filed Dec. 23, 2003, which is commonly owned and incorporated herein by reference in its entirety.

BACKGROUND

It is well known that a radio signal arriving at a receiving antenna location can be scattered by objects in the environment, resulting in a signal at the receiver that is a combination of signals reflected or transmitted by the objects, diffracted by the objects, and/or attenuated through the objects. Such environments are called electromagnetic scattering environments. Conventional radio signal receivers sometimes employ antenna diversity to improve the received signal quality of such scattered signals, typically employing two antennas having different polarizations or two antennas separated, for example, by a wavelength of the carrier frequency. Different methods are used to combine the signals intercepted by the two antennas. A low cost method of switching between them can provide substantial improvement in some situations. A higher cost method of combining the signals that uses a radio frequency combiner will typically provide equal or better results. In conventional diversity antenna systems, a separation between two antennas is typically chosen to minimize the correlation of the signals being received at each antenna. Some cellular systems employ two antenna diversity systems for fixed equipment, in which a separation of two antennas that is determined by the carrier wavelength provide improved performance. Another example of separation diversity is found in wireless routers that operate according to the 802.11 (b) standard promulgated by the Institute of Electrical and Electronic Engineers (IEEE). In some of these systems, the fixed router unit has two antennas at fixed distances, but the antennas can be rotated, thereby changing their relative polarization. Polarization diversity can be obtained by using dual polarized antennas, which can require less enclosed volume and has provided improved performance in portable radios. Such approaches utilize fixed physical arrangements that are chosen to provide good improvement over non-diversity antennas in many situations. However, as the carrier frequencies that are used for new radio communication systems increase, the scattering of electromagnetic energy by objects in the environment has a more degrading impact on the received radio signal and the electromagnetic scattering environment can differ substantially between fixed locations that are not far apart. In these situations, the improvements afforded by a fixed physical arrangement of two diversity antennas diminished, and a better approach is needed.

BRIEF DESCRIPTION OF THE DRAWINGS

The present invention is illustrated by way of example and not limitation in the accompanying figures, in which like references indicate similar elements, and in which.

Figure 1:
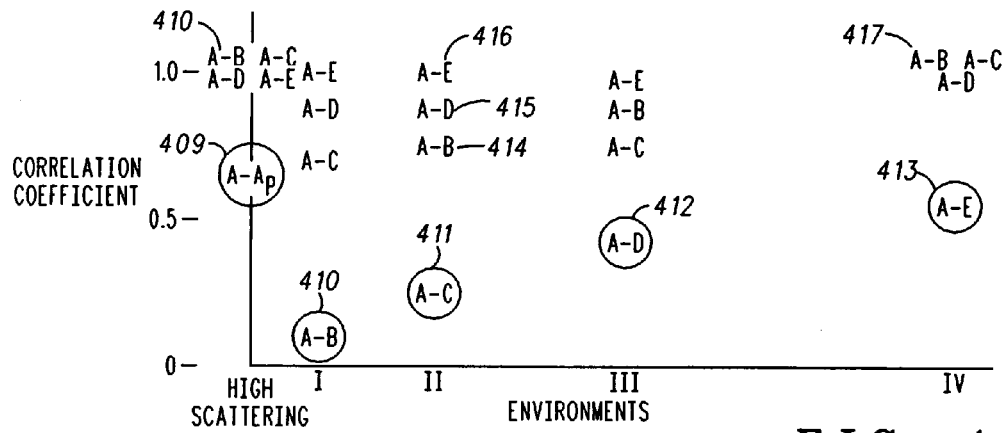
FIG. 1 is a simplified plot of correlation coefficients for pairs of antenna elements for a set of five electromagnetic environment (EME) types, in accordance with embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular antenna diversity technique in accordance with the present invention, it should be observed that the present invention resides primarily in combinations of method steps and apparatus components related to diversity antenna systems. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

As is known in the art, signals from elements of two antennas that are separated can sometimes be combined in a technique known as antenna diversity, and the combined signal might be a better signal from which to recover the original information than the signal intercepted by either antenna. The separation of conventional diversity antennas is typically fixed and is typically based on a simplified theoretical conclusion, such as one that the scattering environment is homogeneous. The present invention uses new understanding recently gained that a scattering environment is in fact inhomogeneous and a diversity antenna separation determined by conventional techniques that rely only on environmental models such as line of sight, Rician, or Rayleigh, do not always predict optimum antenna diversity arrangements, particularly in scattering environments. It has been recently determined that antenna arrangements for achieving diversity improvement for a given frequency band can be better optimized using signal correlation measurements made in actual or modeled electromagnetic environments of distinctly differing types that are characterized by the density and type of scatterers that are significant at the given frequency band. It has also been determined that the selection of antenna elements of such an optimized antenna arrangement for providing optimized combining of diversity signals can be done either by identifying the type of electromagnetic environment or by correlation measurements made at the site using the antenna arrangement. Identifying the type of electromagnetic environment can be done using environmental modeling of the actual site where the antenna arrangement is being used, or by a site type determination based on measurements made on site by an experienced RF technologist.

Referring to FIG. 1, a simplified plot of correlation coefficients for pairs of antenna elements is shown for a set of five electromagnetic environment (EME) types, and will be used to describe a method of establishing an optimum diversity antenna arrangement for recovering a modulated radio signal that is intercepted by the antenna arrangement. It will be appreciated that diversity combining of two versions of a radio signal transmitted by one transmitter and intercepted by two antenna elements provides better improvement over receiving either one of the two signals when the phase and amplitude correlation between the two signals is minimum. This can be characterized by the correlation coefficient of the two signals, which varies from a value of 0 to 1.0, with lower values indicating less correlation (and therefore better results). For some frequency bands, up to seven distinct EME types have been identified, but the principles of the present invention are equally applicable in cases using seven or less than seven EME types. The EME types in the example described with reference to FIG. 1 are identified as High Scattering, I, II, III, and IV. EME type IV represents an electromagnetic environment having few scattering objects that are effective (at the frequency band of transmission) near a receiver that is using the antenna arrangement to intercept energy from the transmitter. For a wide area network, this may represent a rural situation, and is a situation in which nulls in the electromagnetic field are far apart. EME types III, II, and I represent electromagnetic environments of increasingly effective and dense scattering objects near the receiver, where nulls in the electromagnetic field are distinct and closer together. High Scattering represents an electromagnetic environment wherein the radio signal at the receiver is formed by many scattered components where the nulls are very closely spaced.

A set of optimum antenna element separations is determined for a set of EME types by determining for each EME type a minimum correlation coefficient (CC) of a radio signal that is intercepted by an antenna element of each of a pair of antennas, wherein the antenna elements have the same (a common) polarization. The optimum spacing is determined by finding the separation of the pair of antennas (and therefore the separation of the elements) at which a minimum value of the CC occurs. This can be done by electromagnetic modeling techniques or by field tests. Both methods have been shown to provide the same results. It has been found that distinct EME types have different values of CCs at the optimum antenna spacing for the EME type, and that the optimum antenna separation is different for each EME type. This is indicated in FIG. 1 by correlation coefficients 409, 410, 411, 412, 413, which are optimum CC's for the EME types High Scattering, I, II, III, and IV, as indicated on the horizontal axis.

Each measured or modeled correlation coefficient is indicated in FIG. 1 by nomenclature that indicates an element combination (pair). For this example the element combinations are A-$A_P$, A-B, A-C, A-D, and A-E. The combination A-$A_P$ indicates a pair of polarized elements of a dual polarized antenna (antenna A), which, for example, may be polarized 90 or 120 degrees apart. Combinations A-B, A-C, A-D, and A-E indicate antenna element combinations having a common polarization and increasing separations. For example, A-C indicates a combination of antenna elements having the same polarization—an element from antenna A and an element from antenna C. For each of the EME types other than the High Scattering environment, there is a range of correlation coefficient values 410, 411, 412, 413 that represents an optimum (lowest) attainable range of correlation coefficients (CCs). The optimum attainable range of CC for each EME type is obtained at an optimum spacing of antenna elements that have the same polarization, which is identified by the nomenclature described above. The CCs can be determined either by electromagnetic modeling or field testing, and they are ranges because they are statistical measurements of values that vary. The ranges are represented in FIG. 1 by the height of the ellipses for the optimum values. It will be appreciated that the optimum CC values 410, 411, 412, 413 decrease as the EME type changes from the rural/low scattering to urban. When a combination of elements of the same polarization is used to measure a CC for an environment other than the one for which the combination is ideal, the resulting CC (actually, range of CC's) is, of course, worse than the optimum value attained with the elements at the optimum separation. As an example, the CC's 414, 415, 416 for separations A-B, A-D, and A-E are greater than the optimum CC for antenna element separation A-C in EME type II. For EME type IV, the antenna element separations A-B, A-C, and A-D are all deteriorated to a CC value 417 near 1.0 in this example. However, when scattering becomes severe, no particular separation of elements having the same polarization is effective to reduce the correlation coefficient 410 substantially below a value of 1. This may be due to the impracticality of providing two elements at a very small separation to intercept what should be independent versions of a signal. In these circumstances, it has been found that changing to two elements that have orthogonal polarization will often provide improved signal recovery. This is indicated by the correlation coefficient value 409. In general, the separations A-B, A-C, A-D, and A-E for the optimum CCs are not necessarily linearly related to each other or to the wavelength of the frequency band, as is the case in conventional antenna arrays and conventional diversity antenna arrangements.

Once a set of optimum antenna separations for a set of electromagnetic environment types has been determined, an antenna arrangement may be devised for a receiver type and used for operational installations. Although optimum performance may be obtained using the separations obtained by the electromagnetic modeling and/or field testing, physical constraints may necessitate a variation to these ideal separations; in particular, it may be necessary to reduce (or possibly eliminate) the separation of the maximum optimum separation to avoid unduly enlarging a product's size.

In summary, a method for establishing an optimum diversity antenna arrangement for recovering a modulated radio signal that is intercepted by the diversity antenna arrangement includes 1) identifying a set of electromagnetic environment types that comprises distinct radio environments for a particular frequency range, 2) determining a set of optimum antenna separations for the set of electromagnetic environment types, wherein each optimum antenna separation provides a minimum correlation coefficient, and 3) establishing the optimum diversity antenna arrangement by determining an arrangement of antennas that provides a plurality of antenna separations determined from the set of optimum antenna separations and includes at least one dual polarized antenna. The set of separations are not necessarily linearly related with the frequency or wavelength.

Figure 2:
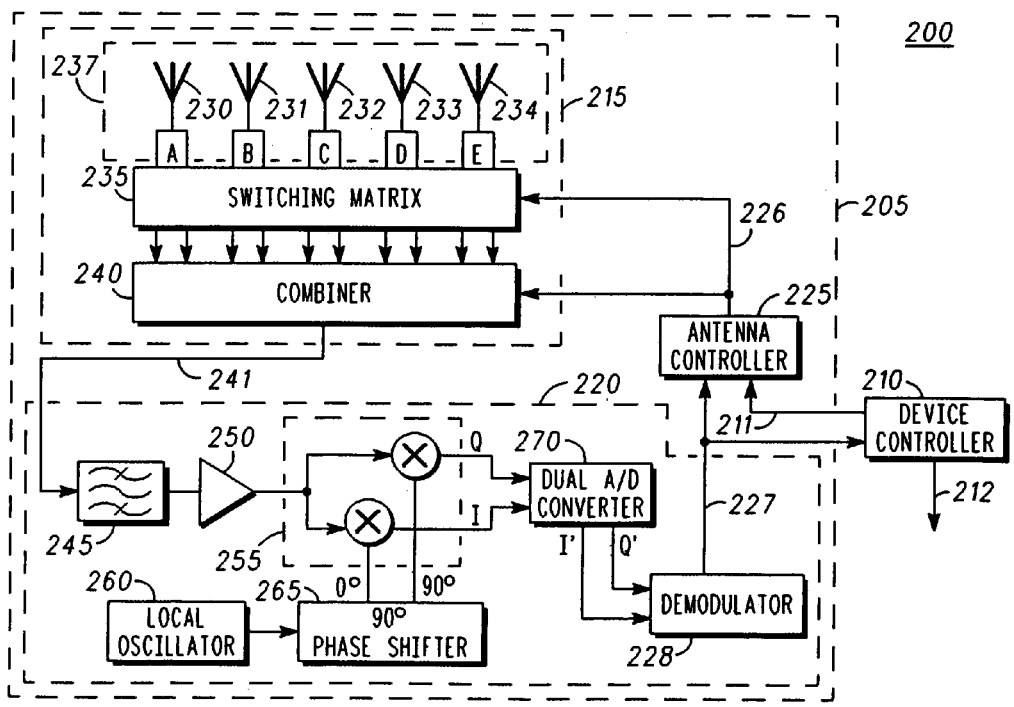
FIG. 2 is a block diagram of a portion of an electronic device that uses antenna diversity, in accordance with the preferred embodiment of the present invention.

Referring to FIG. 2, a block diagram of a portion of an electronic device 200 that uses antenna diversity is shown, in accordance with the preferred embodiment of the present invention. The electronic device 200 may be any electronic device that communicates using radio frequency (RF) signals and that is stationary or relatively stationary (i.e., moving slowly relative to a wavelength of the frequency at which the device is operating). A few examples are a network receiving antenna arrangement, a cellular telephone, a personal digital assistant, a local area network or personal area network wireless router, and an appliance control receiver. Although the benefits of the present invention may accrue to devices operating below 1 GHz, they are more likely to be realized in electronic devices that operate above 1 GHz, because such devices are more likely to be moved from place, and to be in electromagnetic scattering environments that change while the electronic device is stationary. The portion of the electronic device 200 shown in FIG. 2 comprises an antenna system 205 coupled bi-directionally to a device controller 210 by antenna controller input signals 211, 227. The electronic device 200 will typically comprise other components, such as a display, keys, switches, external connectors, and batteries—depending on the type of electronic device 200. The device controller 210 may be a stored program controller processor or a state machine, or a portion of a stored program controller processor or a state machine. The device controller 210 may include applications, such as user interface functions, location finding functions, speed detecting functions, handoff algorithms, games, and internet browsing functions. The antenna controller input signal 227 comprises a demodulated signal obtained from RF signals intercepted by the antenna system 205. The antenna controller input signal 211 may include an identification of an application that uses information included in the demodulated signal included in signal 227, and in some embodiments may also include an identification of an EME type.

The antenna system 205 comprises an antenna structure 215, a receiver 220, and an antenna controller (antenna system controller) 225. In one embodiment the antenna controller 225 is a digital signal processor, but in others it may be any combination of processing apparatus, such as a stored program controlled microprocessor, a computer, a neural network processor, and it may be combined with the device controller 210 or another controller in the electronic device 200. The antenna structure 215 comprises an arrangement of antennas 237, which in the embodiment shown in FIG. 2 comprises dual polarized antennas 230, 231, 232, 233, 234; a switching matrix 235 to which the arrangement of antennas 237 and the antenna system controller 225 are coupled; and a combiner 240 to which the switching matrix 235 and the antenna system controller 225 may be coupled. The switching matrix 235 couples a subset of the signals generated by a selected subset of the elements of the arrangement of antennas to the combiner 240 and rejects signals not from the selected subset of elements. The rejection may be, for example, by grounding the rejected signal or by causing an essentially open circuit to the rejected signal. The subset is selected by a subset selection signal 226 coupled from the antenna controller system. In some embodiments a subset is either one or two antenna elements, where the two elements are also referred to as a combination of antenna elements, or an element combination. The antenna system controller 225 selects just one antenna element at a time when a correlation coefficient is being measured.

The combiner 240 may be a non-configurable device (i.e., it may not need control signals to accomplish combining the subset of signals selected by the switching matrix 235), in which case it may not be coupled to the antenna controller 225. The switching matrix 235 and the combiner 240 may be combined into one functional component. The combiner 240 combines the signals from the selected antenna elements into a combined RF signal 241. (If only one signal is selected, then of course there is no combining). Each individual dual polarized antenna 230, 231, 232, 233, 234, the switching matrix 235, and the combiner 240 may be designed and fabricated using conventional or other techniques. For example, the antennas of the antenna structure 215 may be of any conventional structure such as wire or tube elements (particularly at frequencies below 1 GHz), printed circuit board runners, or metal depositions in an integrated circuit. Each antenna has at least one element that has a polarization that is common (the same) in the plurality of the antennas in the antenna arrangement 237. The maximum number of antennas may be limited by space in the electronic device and/or cost/benefit considerations. It may be that not all of the antennas in the antenna arrangement 237 are dual polarized (polarimetric) antennas, but it is preferable that at least one is a dual polarized antenna. The spacing of the antennas in the arrangement of antennas 237 in the present invention is uniquely determined, as described above with reference to FIG. 1. The arrangement of antennas 237 in the electronic device 200 illustrated in FIG. 2 comprises five antennas, which could be spaced to provide the separations A-B, A-C, A-D, A-E described above with reference to FIG. 1. The receiver 220 is coupled to the combined RF signal 241 generated by the combiner 240. The combined RF signal 241 is coupled to a band pass filter 245 that eliminates out of band energy. The filtered signal is then coupled to an amplifier 250 that amplifies the filtered signal. A complex mixer 255 mixes the amplified signal with in-phase and quadrature phase local oscillator signals generated by phase shifter 265 from a local oscillator signal generated by local oscillator 260. The complex mixer 255 generates analog baseband in-phase (I) and quadrature (Q) signals that are coupled to dual analog-to digital converter 270, which generates digitally sampled in-phase (I') and quadrature (Q') signals that are coupled to a demodulator 228, which generates a demodulated signal 227 that is coupled to the antenna controller 225 and the device controller 210. The antenna controller 225 use the demodulated signal 227 to evaluate characteristics of the combined RF signal, such as the envelope, that are used as one basis for determining the subset selection signal 226. In some embodiments, the functions of the demodulator 228 and antenna controller 225 are performed by the same processor or intelligent network. In other embodiments, the I' and Q' signals may be coupled to the antenna controller 225, where they are used for subset selection, and to the device controller 210 wherein they are demodulated. The device controller 210 extracts digital information from the demodulated signal. Thus, information is extracted from the combined RF signal 241. Other components of the receiver 220, for example, filters and power distribution circuits, are not shown in FIG. 2. Many other types of receivers may be used in other embodiments of the present invention to generate a signal or signals from the combined RF signal that can be analyzed by an antenna controller 225 for envelope evaluation of the combined RF signal. The antenna controller 225 may only evaluate the envelope of the combined RF signal; the digital information may be extracted in another controller of the electronic device 200. In the example described, five antennas are used to provide four spacings, such as the spacings A-B, A-C, A-D, and A-E described with reference to FIG. 1. It will be appreciated that in this example, the antenna spacing A-D might be very nearly the same as the spacing B-E that results from the placement of antenna B to obtain the optimum spacing A-B. In this situation, antenna D may not be necessary; the element combination B-E could be used instead. Thus, in general, the number of antennas in the antenna arrangement may be able to provide more separations than those obtained by always including one "base" antenna (i.e., antenna A) in every element combination.

Figure 3:
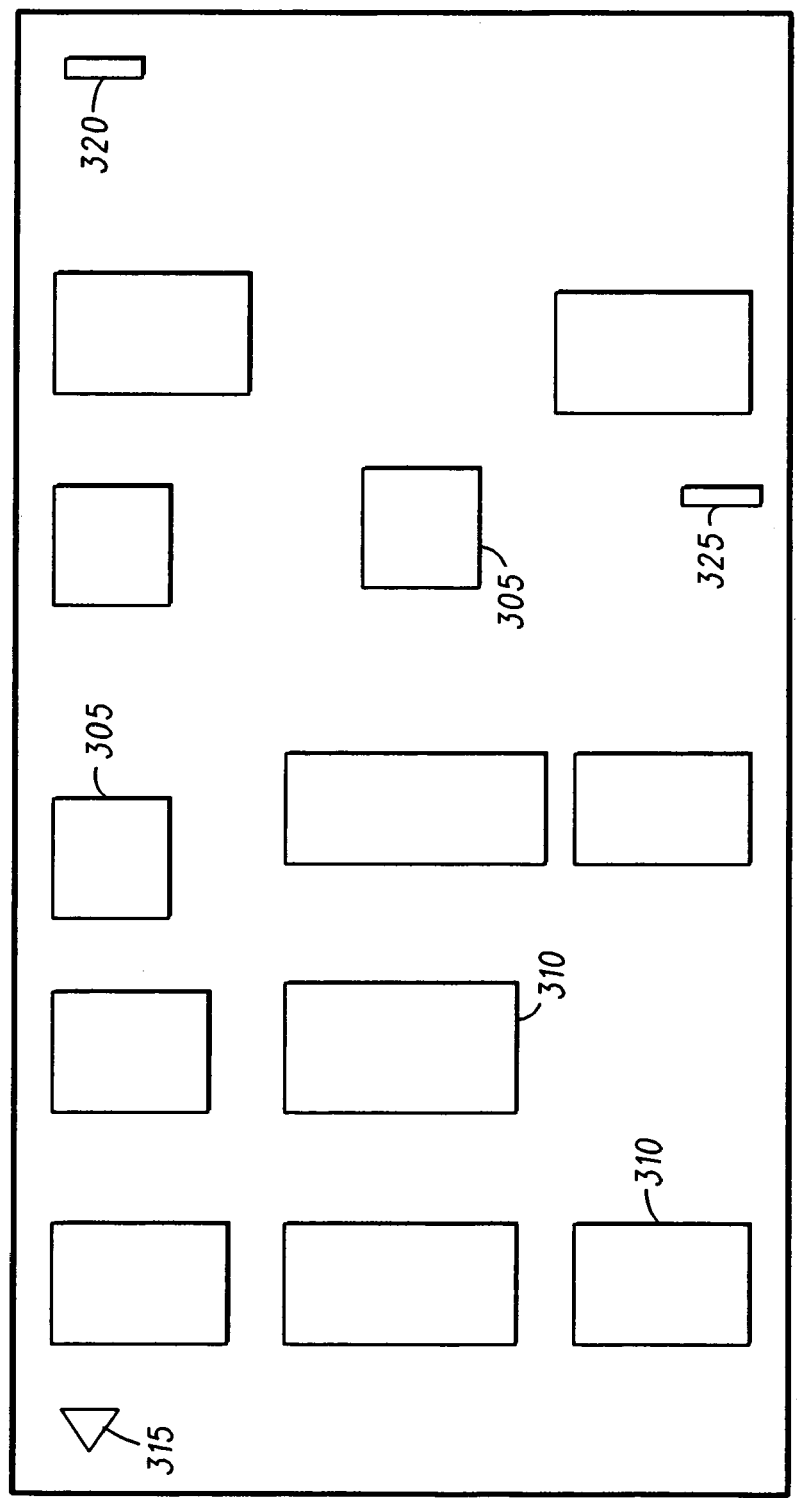
FIG. 3 is a plan view drawing of a portion of a story of a building in which electronic devices using diversity are used, in accordance with an embodiment of the present invention.

Referring to FIG. 3, a plan view drawing of a portion of a story of a building 300 in which electronic devices using antenna diversity is shown, in accordance with an embodiment of the present invention. In the portion of the building 300 is located a transmitting antenna 315 that transmits a radio frequency (RF) signal that is modulated to include information within an RF bandwidth. The portion of the building 300 includes structures such as offices and cubicles (some offices 310 and cubicles 305 are identified in FIG. 3) that act, along with other items, such as ductwork and wiring, as electromagnetic scatterers for the frequencies within the RF bandwidth. Electronic devices 320, 325 are located at two different locations in the portion of the building 300. Each of the electronic devices 320, 325 includes an arrangement of antennas in antenna systems that are used to intercept the RF radio signal and thereby facilitate recovery of the information in the modulated RF signal (also described as simply recovering the modulated radio signal). The RF frequencies within the RF bandwidth are preferably such that the arrangement of antennas can include effective antennas and such that the arrangement of antennas does not substantially increase the volume occupied by the electronic devices 320, 325 above that needed for one efficient antenna. For example, at 5 GHz and above, an arrangement of antennas having antennas at separations up to one wavelength may be smaller than 6 centimeters in a longest dimension. The antenna system 205 illustrated in FIG. 2 (showing dual polarized antennas at five positions), is a example of a system that may be used in the electronic devices 320, 325, but the arrangements of antennas could have more or fewer antennas in them.

The present invention includes unique techniques for selecting antenna element combinations from the arrangement of antennas that optimize a combined signal that is recovered using the selected element combinations. For receivers 320, 325 that are intended to be used in a variety of locations, the ability to optimize the selection of antenna elements is advantageous because the receivers of one type of equipment (including the arrangement of antennas) can be manufactured identically and do not require manual settings. The present invention is of course also applicable at lower frequencies where the arrangement of antennas may be physically large in comparison to the receiver, and may provide distinct advantages in some circumstances (for example, when the scattering environment is expected to change substantially with time).

One technique for selecting the optimum set of antenna elements uses external information 212 (FIG. 2) that is received by the device 320, 325. The external information 212 identifies the electromagnetic scattering environment (EME) type. Two examples of such external information 212 are an operator input an a simulation input, which are classifications of external information according to the source that makes the determination. The external information may be conveyed by local means such as a keyboard or by a message sent to the electronic device 320, 325. The external information is accepted by the device controller 210 and passed to the antenna system controller 225 in antenna controller signal 211, which uses the external information 212 and a table that stores information that correlates an EME type to a best antenna element combination. The best antenna element combination has a separation closest to the optimum separation of antenna elements described with reference to FIG. 1 and is preferably equal to the optimum separation, but may have to be different due to physical design constraints for the device 320, 325. Radio signals from the antenna elements of the best element combination are combined and used to generate a demodulated signal 227. The demodulated signal 227 is used in most devices 320, 325 to recover information that is used by at least one application that is run by the device controller. Examples of applications are direction detection, location finding, speed detection and handoff algorithms. The selection of the best antennas elements can be beneficially modified according to which application is using the demodulated radio signal 227, so in some embodiments the device controller 210 identifies the application using the demodulated radio signal 227 to the antenna system controller 225 and the antenna system controller 225 uses the identification of the one application and the electromagnetic scattering environment type to select the best element combination.

Another technique for selecting the best set of antenna elements uses correlation coefficient measurements determined from the demodulated radio signal 227 as it is received at each element combination of a set of element combinations. For the antenna arrangement of the example described above with reference to FIGS. 1 and 2, this amounts to measuring the correlation coefficients for the antenna elements having the same polarization in antennas A-B, A-C, A-D, and A-E. The antenna system controller 225 then selects an element combination that has a lowest correlation coefficient of elements having the same polarization when the lowest correlation coefficient is below a threshold value and otherwise selects an orthogonally polarized element combination. The threshold value may be, for example, 0.80.

In yet another technique for selecting the best set of antenna elements, current correlation coefficient measurements determined from the demodulated radio signal 227 are measured as in the previously described technique. However, in this technique, the device controller 210 identifies an application to the antenna system controller 225 that is using the demodulated radio signal 227, and the antenna system controller 225 uses the identified application in combination with the measured correlation coefficients and prior information to determine the best element combination. For this technique, the antenna controller may comprise an intelligent network, such as a fuzzy logic processor or a neural network to provide speedier and better selections, and prior information comprising all the measured or simulated correlation coefficients determined for each EME type during a design phase are used to select the best element combination.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "plurality", as used herein, is defined as two or more than two. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application (an application), an applet, a servlet, a source code, an object code, a shared library/dynamic load library and/or other sequence of instructions designed for execution on a computer system. A "set" as used herein, means a non-empty set (i.e., for the sets defined herein, comprising at least one member)

What is claimed is:

1. A method for using a arrangement of antennas to recover a modulated radio signal, comprising:
    identifying an electromagnetic scattering environment type as one of a set of electromagnetic scattering environment types;
    selecting a best element combination from the arrangement of antennas based on the electromagnetic scattering environment type; and
    combining radio signals intercepted by the best element combination, wherein the identifying of the electromagnetic scattering environment type comprises using a current set of correlation coefficient measurements made using a radio signal received at each best element combination of a set of element combinations.

2. The method according to claim 1, wherein the identifying of the electromagnetic scattering environment type uses an operator input.

3. The method according to claim 1, wherein the identifying of the electromagnetic scattering environment type uses information received in a message.

4. The method according to claim 1, wherein the selecting of the best element combination is further based upon a selected application that uses information in the combination of radio signals.

5. The method according to claim 1, wherein the identifying of the electromagnetic scattering environment type comprises further using prior information obtained using the set of electromagnetic scattering environment types.

6. A method for using an arrangement of antennas to recover a modulated radio signal, comprising:
    measuring a set of correlation coefficients, each correlation coefficient determined using a radio signal intercepted at each element of a corresponding element combination having a first polarization orientation, each corresponding element combination formed from two elements in the arrangement of antennas;
    determining a lowest correlation coefficient of the set of correlation coefficients; and
    combining radio signals intercepted by the element combination corresponding to the lowest correlation coefficient when the lowest correlation coefficient has a value below a threshold value; and
    combining radio signals intercepted by two orthogonally oriented elements of the arrangement of antennas when the lowest correlation coefficient has a value above the threshold value.

7. An antenna system, comprising: an antenna structure, comprising
    an arrangement of antennas, each antenna comprising at least one element that has a common polarization, and at least one antenna that is a dual polarized antenna;
    a signal combiner that combines radio signals intercepted by an element combination into a combined radio signal; and
    a switching matrix that selects a best element combination of the arrangement of antennas;
    a signal receiver, coupled to the arrangement of antennas, that generates a demodulated signal from the combined radio signal; and
    an antenna system controller coupled to the signal receiver and antenna structure that selects the best element combination based on an electromagnetic scattering environment type identified from a set of electromagnetic scattering environment types.

8. The antenna system according to claim 7, wherein the arrangement of antennas is characterized by a set of antenna separations that are optimized to provide lowest correlation coefficients for a corresponding set of electromagnetic environment types.

9. The antenna system according to claim 7, wherein the best element combination is one of a dual polarized element combination and a separated element combination, and wherein the dual polarized element combination comprises two orthogonal elements of an antenna in the arrangement of antennas that is a dual polarized antenna, and wherein the separated element combination comprises two elements having the same polarization selected from two antennas of the arrangement of antennas.

10. The antenna system according to claim 7, further comprising an input that accepts external information identifying the electromagnetic scattering environment type.

11. The antenna system according to claim 10, wherein the external information is one of an operator input and a simulation input.

12. The antenna system according to claim 7, further comprising:
    a device controller, coupled to the signal receiver, that processes the demodulated signal to recover information that is used by at least one application that is run by the device controller.

13. The antenna system according to claim 12, wherein the information in the combined radio signal is used by one application of a set of applications, and wherein the device controller identifies the one application to the antenna system controller, and wherein the antenna system controller uses the identification of the one application and the electromagnetic scattering environment type to select the best element combination.

14. An antenna system, comprising:
    an antenna structure, comprising
        an arrangement of antennas, each antenna comprising at least one element that has a common polarization, and at least one antenna that is a dual polarized antenna;
    a signal combiner that combines radio signals intercepted by an element combination into a combined radio signal; and
    a switching matrix that selects a best element combination of the arrangement of antennas;
    a signal receiver, coupled to the arrangement of antennas, that generates a demodulated signal from the combined radio signal; and
    an antenna system controller coupled to the signal receiver and antenna structure that selects the best element combination based on correlation coefficient measurements made using a radio signal received at each element combination of a set of element combinations.

15. The antenna system according to claim 14, wherein the antenna system controller selects as the best element combination one that has a lowest correlation coefficient for elements having a common polarization when the lowest correlation coefficient is below a threshold value and otherwise selects an orthogonally polarized element combination.

16. The antenna system according to claim 15, wherein the information in the combined radio signal is used by one application of a set of applications, and wherein the device controller identifies the one application to the antenna system controller, and wherein the antenna system controller uses the identification of the one application and the correlation coefficient measurements to select the best element combination.

17. The antenna system according to claim 16, wherein the antenna system controller comprises an intelligent network.

18. The antenna system according to claim 14, further comprising:
 a device controller, coupled to the signal receiver, that processes the demodulated signal to recover information that is used by at least one application that is run by the device controller.

19. A method for establishing an optimum diversity antenna arrangement for recovering a modulated radio signal that is intercepted by the diversity antenna arrangement, comprising:
 identifying a set of electromagnetic environment types that comprises distinct radio environments for a particular frequency range;
 determining a set of optimum antenna separations for the set of electromagnetic environment types, wherein each optimum antenna separation provides a minimum correlation coefficient; and
 establishing the optimum diversity antenna arrangement by determining an arrangement of antennas that provides a plurality of antenna separations determined from the set of optimum antenna separations and includes at least one dual polarized antenna.

20. The method for establishing an optimum diversity antenna arrangement according to claim 19, wherein the set of separations are not necessarily linearly related with the frequency or wavelength.

* * * * *

UNITED STATES PATENT AND TRADEMARK OFFICE
CERTIFICATE OF CORRECTION

| | | |
|---|---|---|
| PATENT NO. | : 7,277,731 B2 | Page 1 of 1 |
| APPLICATION NO. | : 10/960808 | |
| DATED | : October 2, 2007 | |
| INVENTOR(S) | : Stratis et al. | |

It is certified that error appears in the above-identified patent and that said Letters Patent is hereby corrected as shown below:

On the Title Page, in Field (56), under "U.S. PATENT DOCUMENTS", in Column 2, Line 1, delete "6,608,606 B1*   8/2003   Chang" and insert -- 6,608,600 B2*   8/2003   Eriksson --, therefor.

Signed and Sealed this

Seventh Day of July, 2009

JOHN DOLL
*Acting Director of the United States Patent and Trademark Office*